(12) United States Patent
Shirie

(10) Patent No.: US 6,556,789 B2
(45) Date of Patent: Apr. 29, 2003

(54) DIAPHRAGM SWITCHING APPARATUS

(75) Inventor: Nobuyuki Shirie, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/107,196

(22) Filed: Mar. 28, 2002

(65) Prior Publication Data

US 2002/0141748 A1 Oct. 3, 2002

(30) Foreign Application Priority Data

Mar. 30, 2001 (JP) ........................................ 2001-101453

(51) Int. Cl.$^7$ .............................. G03B 3/10; G03B 9/02; G03B 13/34
(52) U.S. Cl. ........................................ 396/132; 396/505
(58) Field of Search ................................ 396/132, 505, 396/508

(56) References Cited

U.S. PATENT DOCUMENTS 6,370,334 B1 * 4/2002 Ishikawa ..................... 396/132

* cited by examiner

Primary Examiner—W. B. Perkey
(74) Attorney, Agent, or Firm—Leydig, Voit & Mayer, Ltd.

(57) ABSTRACT

A diaphragm switching apparatus according to the present invention comprises a gear adapted to rotate in response to a driving force of a focus motor used for driving a focus lens; a shaft for rotatably supporting the gear; a diaphragm switching means, secured to the shaft 12 and adapted to rotate together with the shaft, for switching a diaphragm upon rotating; an intermediate member engaging the diaphragm switching means so as to rotate together with the shaft and being slidable axially with respect to the shaft; an urging means for urging the gear away from the diaphragm switching means by way of the intermediate member by receiving a reaction force from the diaphragm switching means; and a holding part 12a for receiving the gear urged by the urging means.

5 Claims, 8 Drawing Sheets

PRIOR ART

Fig.8

DIAPHRAGM SWITCHING APPARATUS

FIELD OF THE INVENTION

The present invention relates to a diaphragm switching apparatus for switching a diaphragm by utilizing a driving force of a focus motor used for driving a focus lens.

BACKGROUND OF THE INVENTION

For switching a diaphragm in a camera or the like, an actuator such as a plunger has conventionally been employed. However, in order to reduce the size, weight, and cost of cameras, other driving sources mounted in a camera, such as a focus motor for driving a focus lens, for example, may be used for switching the diaphragm with a driving force of the focus motor.

Figure 8:
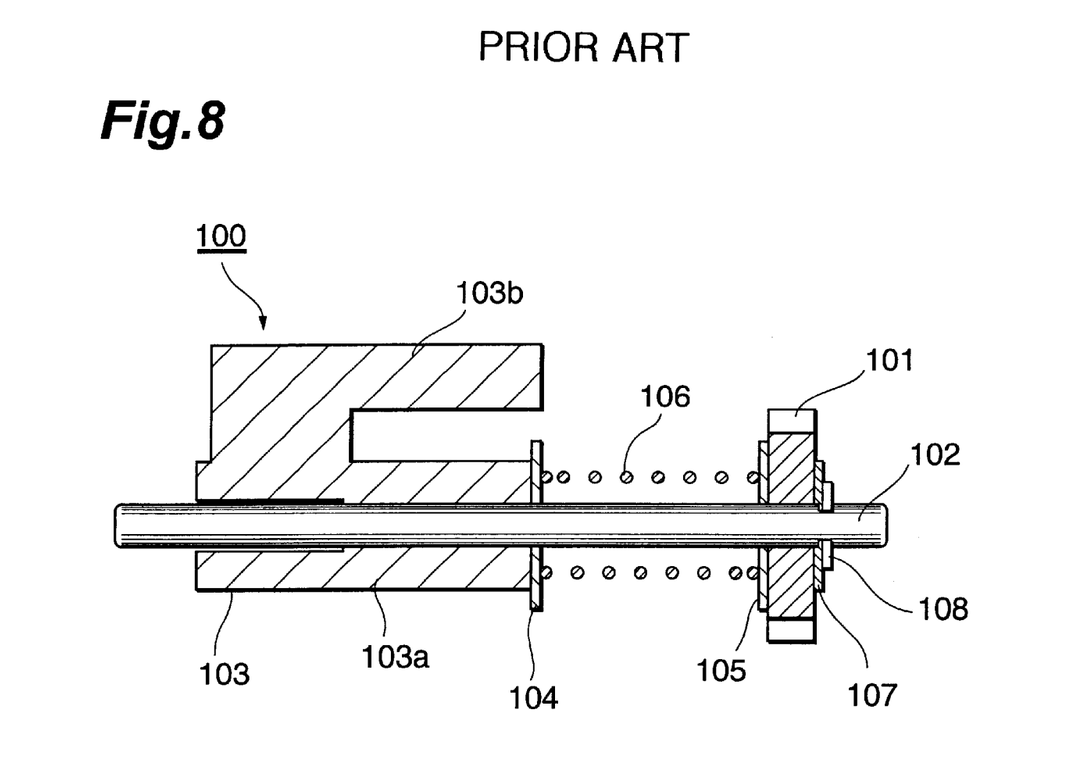
FIG. 8 is an explanatory view of a conventional technique.

Specifically, a diaphragm switching apparatus 100 shown in FIG. 8 maybe considered. This diaphragm switching apparatus 100 comprises a gear 101 adapted to rotate in response to a driving force of a focus motor; a shaft 102 rotatably supporting the gear 101; a diaphragm switching member 103 secured to the axis 102 and adapted to rotate together with the shaft 102; a compression spring 106 for urging the gear 101 away from the diaphragm switching member 103 by way of a washer 105 by receiving a reaction force from the diaphragm switching member 103 by way of a washer 104; and an E ring 108, fitted onto the shaft 102, for receiving the gear 101 urged by the compression spring 106 by way of a washer 107.

The diaphragm switching member 103 comprises a cylindrical barrel 103a in which the shaft 102 is press-fitted, and a lug-shaped protrusion 103b extending from the barrel 103a toward a diaphragm switching lever which is not depicted. The protrusion 103b engages the diaphragm switching lever. The diaphragm switching lever rotates within a predetermined angle range, and switches the diaphragm in two stages of open and stop-down by back-and-force actions of the angular switching.

First, in the diaphragm switching caused by the diaphragm switching apparatus 100, the gear 101 rotates in response to the driving force of the focus motor at the time of focusing. Since the gear 101 is urged by the compression spring 106 so as to be pressed against the E ring 108, the shaft 102 rotates due to a frictional force, and the diaphragm switching member 103 rotates together with the shaft 102. Here, the diaphragm switching member 103 causes the diaphragm switching lever engaged with the protrusion 103b to rotate by a predetermined angle, thereby switching the diaphragm. Then, while the diaphragm switching member 103 and shaft 102 stop rotating at the same time when the diaphragm switching lever stops, the gear 101 rotates in response to the driving force of the focus motor until the driving of the focus lens ends. During this time, the gear 101 idles, thus attaining a slipping rotation state.

SUMMARY OF THE INVENTION

In the above-mentioned diaphragm switching apparatus 100, however, not only the gear 101 but also the washers 104, 105, 107 and compression spring 106 are rotatably supported by the shaft 102. Therefore, when the gear 101 attains a slipping rotation state as the diaphragm switching member 103 and shaft 102 stop rotating upon switching the diaphragm, members attaining a slipping rotation state do not become stable. For example, the washers 105, 107 may rotate together with the gear 101, thereby attaining a slipping rotation state, or the compression spring 106 may also rotate together and attain a slipping rotation state. In particular, when the direction of rotation changes, the site of slippage may change, whereby the load imparted on the driving of the focus motor fluctuates in the slipping rotation state. Since the E ring 108 is press-fitted in a groove formed in the shaft 102, it is not always placed at right angles. When the E ring 108 is inserted obliquely, for example, the washer 107 may tilt and thereby fail to receive the gear 101 in a stable state, i.e., at right angles with respect to the shaft 102, whereby the slipping state becomes unstable.

As a consequence, a large fluctuation may occur in the load applied to the focus motor in the slipping rotation state, which may apply a heavy load to the focus motor, whereby the focus motor may cause malfunctions. For preventing the focus motor from malfunctioning, the torque of focus motor must be set while assuming the highest load, which leads the focus motor to enhance its size, power consumption, and the like, thus opposing the tendency of cameras to reduce their size, weight, and cost.

In view of such circumstances, it is an object of the present invention to provide a diaphragm switching apparatus which can stably switch a diaphragm by using a driving force of a focus motor.

Namely, the diaphragm switching apparatus in accordance with one aspect of the present invention comprises a gear adapted to rotate in response to a driving force of a focus motor used for driving a focus lens; a shaft for rotatably supporting the gear; diaphragm switching means, secured to the shaft and adapted to rotate together with the axis, for switching a diaphragm as the shaft rotates; an intermediate member, attached to the shaft so as to be axially slidable, engaging the diaphragm switching means so as to rotate together with the shaft; urging means for urging the gear away from the diaphragm switching means by way of the intermediate member by receiving a reaction force from the diaphragm switching means; and a holding part for receiving the gear urged by the urging means.

According to this aspect of the present invention, the intermediate member engages the diaphragm switching means, whereas the urging means is placed in contact with the diaphragm switching means and the intermediate member. Therefore, when the diaphragm switching means and shaft stop rotating upon switching the diaphragm, the intermediate member and urging means also stop rotating, thus leaving only the gear to be maintained in a rotating state with respect to the intermediate member and the brim in response to the driving force of the focus motor until the driving of the focus motor ends. Therefore, fluctuations in the load applied to the focus motor in the slipping rotation state can be reduced, whereby the focus lens can be prevented from malfunctioning due to a heavy load applied to the focus motor. Also, since fluctuations in the load applied to the focus motor in the slipping rotation state are small, the torque of focus motor can be set low, whereby the focus motor can reduce its size, weight, and power consumption.

The diaphragm switching apparatus in accordance with another aspect of the present invention is characterized in that the holding part is a brim projecting from the outer periphery of the shaft.

According to this aspect of the present invention, the brim yields neither rattling nor tilting with respect to the shaft, thus being able to receive the gear urged by the urging means in a stable state. As a consequence, fluctuations in the load applied to the focus motor when the gear rotates in a slipping fashion can further be reduced.

The diaphragm switching apparatus in accordance with still another aspect of the present invention is characterized in that a low-friction member is disposed between the intermediate member and the gear and/or between the holding part and the gear.

According to this aspect of the present invention, since a low-friction member is disposed, the frictional force of the gear with respect to the intermediate member and holding part can be reduced when the gear rotates in a slipping fashion, whereby the load applied to the focus motor can be lowered. Therefore, the torque of focus motor can be set lower, whereby the focus motor can further reduce its size, weight, and power consumption.

The diaphragm switching apparatus in accordance with still another aspect of the present invention is characterized in that the urging means is an elastic member such as a compression spring or rubber material, and that the urging force of the urging means is made adjustable by changing the distance between the diaphragm switching means and the holding part.

According to this aspect of the present invention, the distance between the diaphragm switching means and the holding part is changed, so as to adjust the urging force of the urging means, whereby the torque of gear can be adjusted minutely.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Embodiments of the present invention will now be explained with reference to the drawings. Among the drawings, constituents identical to each other will be referred to with numerals identical to each other without repeating their overlapping descriptions. Also, ratios of dimensions in each drawing do not always match those in practice. In the following explanation, the direction of X in the drawings will be defined as the right side.

First Embodiment

The diaphragm switching apparatus 10 in accordance with a first embodiment of the present invention will be explained with reference to drawings.

Figure 1:
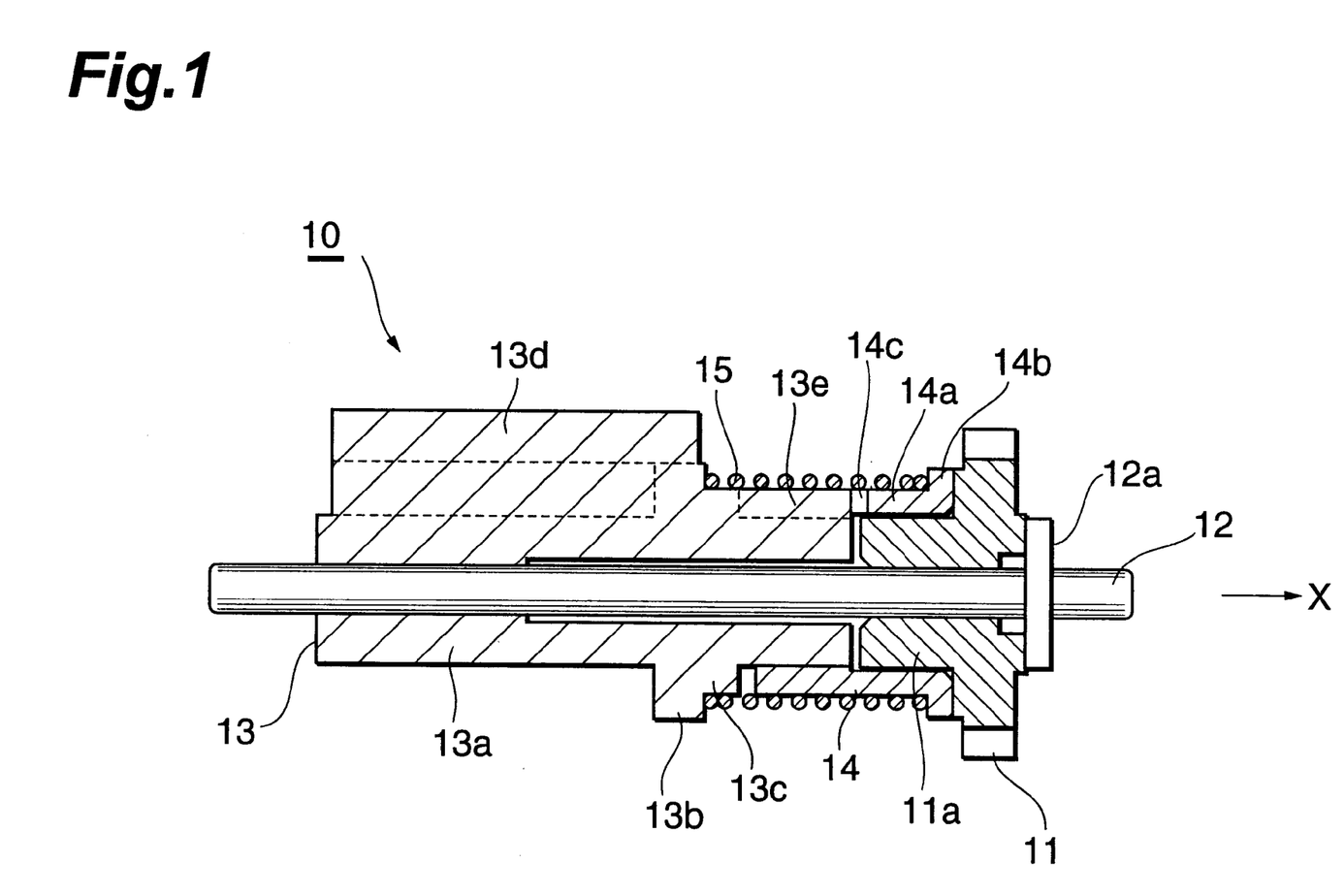
FIG. 1 is an explanatory view of the diaphragm switching apparatus in accordance with a first embodiment of the present invention.
Figure 2:
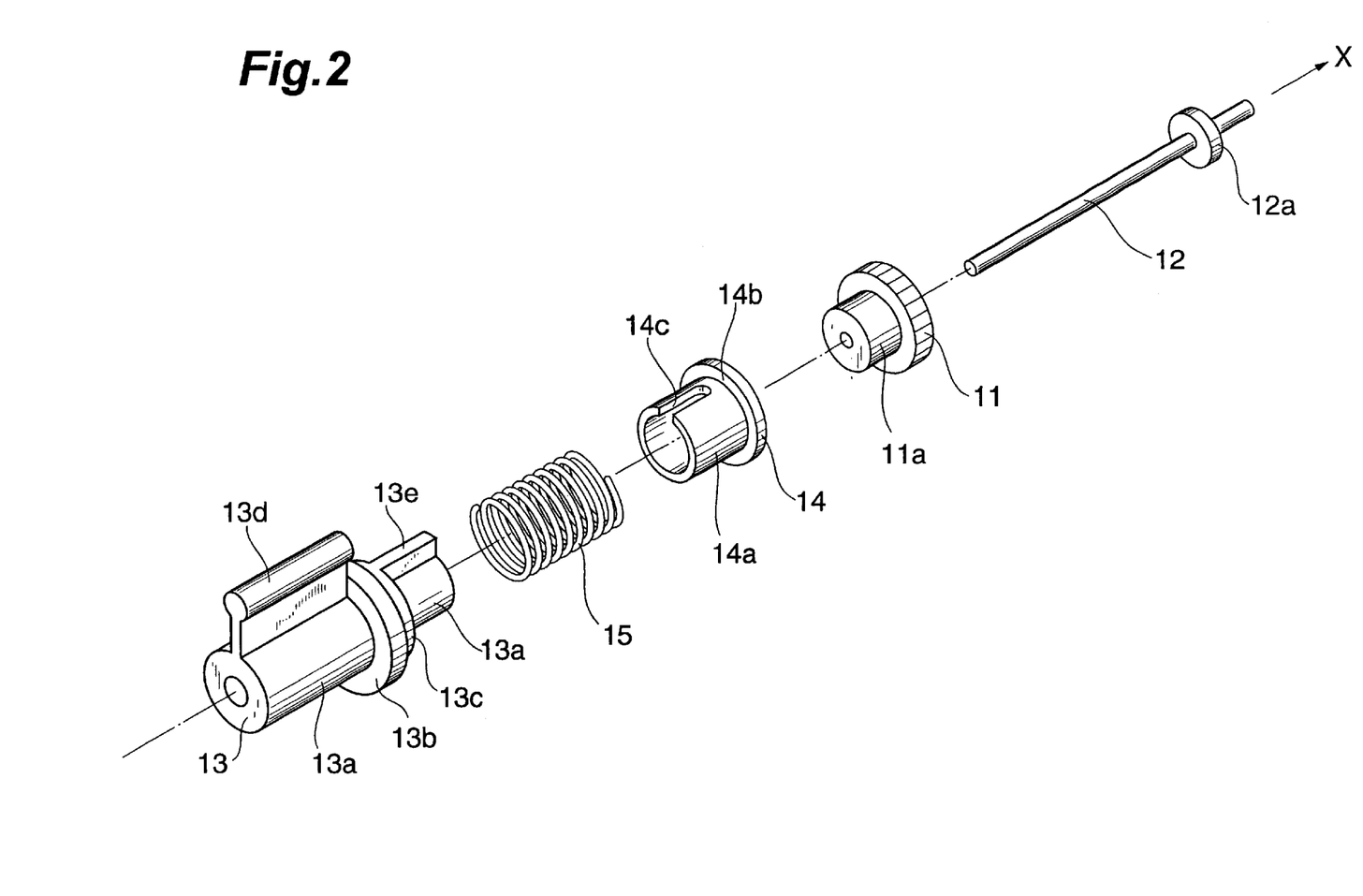
FIG. 2 is an exploded perspective view of the diaphragm switching apparatus of FIG. 1.

FIG. 1 is an explanatory view of the diaphragm switching apparatus 10 in accordance with this embodiment, whereas FIG. 2 is an exploded perspective view of the diaphragm switching apparatus 10.

As shown in FIG. 1, the diaphragm switching apparatus 10 comprises a gear 11 adapted to rotate in response to a driving force of a focus motor used for driving a focus lens; a shaft 12 for rotatably supporting the gear 11; a diaphragm switching member 13 (diaphragm switching means), secured to the shaft 12 and adapted to rotate together with the shaft 12, for switching a diaphragm upon rotating; an intermediate member 14 engaging the diaphragm switching member 13 so as to rotate together with the shaft 12 and being slidable axially with respect to the shaft 12; and a compression spring 15 (urging means) for urging the gear 11 away from the diaphragm switching member 13 by way of the intermediate member 14 by receiving a reaction force from the diaphragm switching member 13.

The gear 11 has an axially formed cylindrical barrel 11a. The inner diameter of the barrel 11a is appropriately set such that the shaft 12 is inserted therein whereby the gear 11 is rotatably supported.

The outer periphery of the shaft 12 is integrally formed with a brim 12a projecting therefrom. At the left end face, the brim 12a abuts against the right end face of the barrel 11a of the gear 11, thereby receiving the gear 11 urged by the compression spring 15 by way of the intermediate member 14.

As shown in FIG. 2, the diaphragm switching member 13 comprises a cylindrical barrel 13a, a larger brim 13b projecting from the outer periphery of the barrel 13a, a smaller brim 13c projecting from the outer periphery of the barrel 13a continuously with the right side of the larger brim 13b, a protrusion 13d projecting from the barrel 13a so as to extend axially on the left side of the larger brim 13b, and an engaging part 13e projecting from the barrel 13a so as to extend axially on the right side of the smaller brim 13c.

As shown in FIG. 1, the inner diameter of the barrel 13a is appropriately set such that the diaphragm switching member 13 is secured to the shaft 12 upon press-fitting, for example. The outer diameter of the barrel 13a is the same as that of the barrel 11a of the gear 11 mentioned above. The protrusion 13d engages a diaphragm switching lever which is not depicted. The diaphragm switching lever rotates by a predetermined angle, and switches the diaphragm in two stages of open and stop-down by its back-and-forth actions.

The intermediate member 14 comprises a cylindrical barrel 14a and a flange 14b formed at the right end of the barrel 14a. The outer diameter of the barrel 14a is the same as that of the smaller brim 13c projecting from the barrel 13a of the diaphragm switching member 13. The inner diameter of the barrel 14a is appropriately set such that the barrel 13a of the diaphragm switching member 13 is inserted from the left side so as to be axially slidable with respect to the intermediate member 14 and that the barrel 11a of the gear 11 is inserted from the right side so as to be rotatable with respect to the intermediate member 14.

As shown in FIG. 2, the barrel 14a of the intermediate member 14 is formed with a cutout 14c axially opening at the left end. As shown in FIG. 1, the barrel 13a of the diaphragm switching member 13 is inserted into the barrel 14a from the left side while the engaging part 13e projecting from the barrel 13a of the diaphragm switching member 13 fits in the cutout 14c, whereby the intermediate member 14 engages the diaphragm switching member 13 so as to be axially slidable without rotating about the axis. The intermediate member 14 abuts against the left end face of the gear 11 at the right end face of the flange 14b as being urged by the compression spring 15, when the barrel 11a of the gear 11 is inserted into the barrel 14a from the right side.

The compression spring 15 is placed over the outer peripheries of the smaller brim 13c projecting from the barrel 13a of the diaphragm switching member 13 and the barrel 14a of the intermediate member 14. At the left end, the compression spring 15 abuts against the right end face of the larger brim 13b projecting from the barrel 13a of the diaphragm switching member 13 and receives a reaction force therefrom. At the right end, on the other hand, the compression spring 15 abuts against the left end face of the flange 14b formed in the barrel 14a of the intermediate member 14, thereby urging the gear 11 away from the diaphragm switching member 13 by way of the intermediate member 14.

Operations of the diaphragm switching apparatus 10 in accordance with this embodiment will now be explained.

First, the gear 11 rotates in response to a driving force of the focus motor at the time of focusing. By way of the intermediate member 14, the compression spring 15 urges the gear 11 away from the diaphragm switching member 13, so as to press it against the brim 12a projecting from the outer periphery of the shaft 12. As a consequence, the shaft 12 is rotated by a frictional force, whereby the diaphragm switching member 13 secured to the shaft 12 also rotates. Here, the intermediate member 14 is engaged with the diaphragm switching member 13, whereas the compression spring 15 is placed in contact with the diaphragm switching member 13 and the intermediate member 14. Therefore, the intermediate member 14 and the compression spring 15 rotate together.

Upon this rotation, the diaphragm switching member 13 rotates the diaphragm switching lever engaged with the protrusion 13d by a predetermined angle, thereby switching the diaphragm.

When the diaphragm switching lever rotates by a predetermined angle, the diaphragm switching lever stops acting, so that the diaphragm switching member 13 abutting against the diaphragm switching lever and the shaft 12 also stop rotating, whereby the intermediate member 14 and the compression spring 15 stop rotating at the same time. Thus, only the gear 11 is kept in a rotating state in response to the driving force of the focus motor until the driving of the focus lens ends.

According to the diaphragm switching apparatus 10 in accordance with this embodiment, as explained in the foregoing, only the gear 11 is kept in a rotating state in response to the driving force of the focus motor until the driving of the focus lens ends. Namely, fluctuations in operations such as the gear 11 rotating alone or the compression spring 15, intermediate member 14, and the like rotating together with the gear 11 depending on attaching states of the compression spring 15 and intermediate member 14 and the like can be prevented from occurring. Also, since the brim 12a is integrally formed on the shaft 12, the gear 11 urged by the compression spring 15 can be received by the brim 12a in a stable state without rattling and tilting.

Therefore, fluctuations in the load applied to the focus motor at the slipping rotation state can be reduced, whereby the focus lens can be prevented from malfunctioning due to a heavy load applied to the focus motor.

Further, since fluctuations in the load applied to the focus motor in the slipping rotation state are small, the torque of focus motor can be set low, whereby the focus motor can reduce its size, weight, and power consumption.

Figure 3:
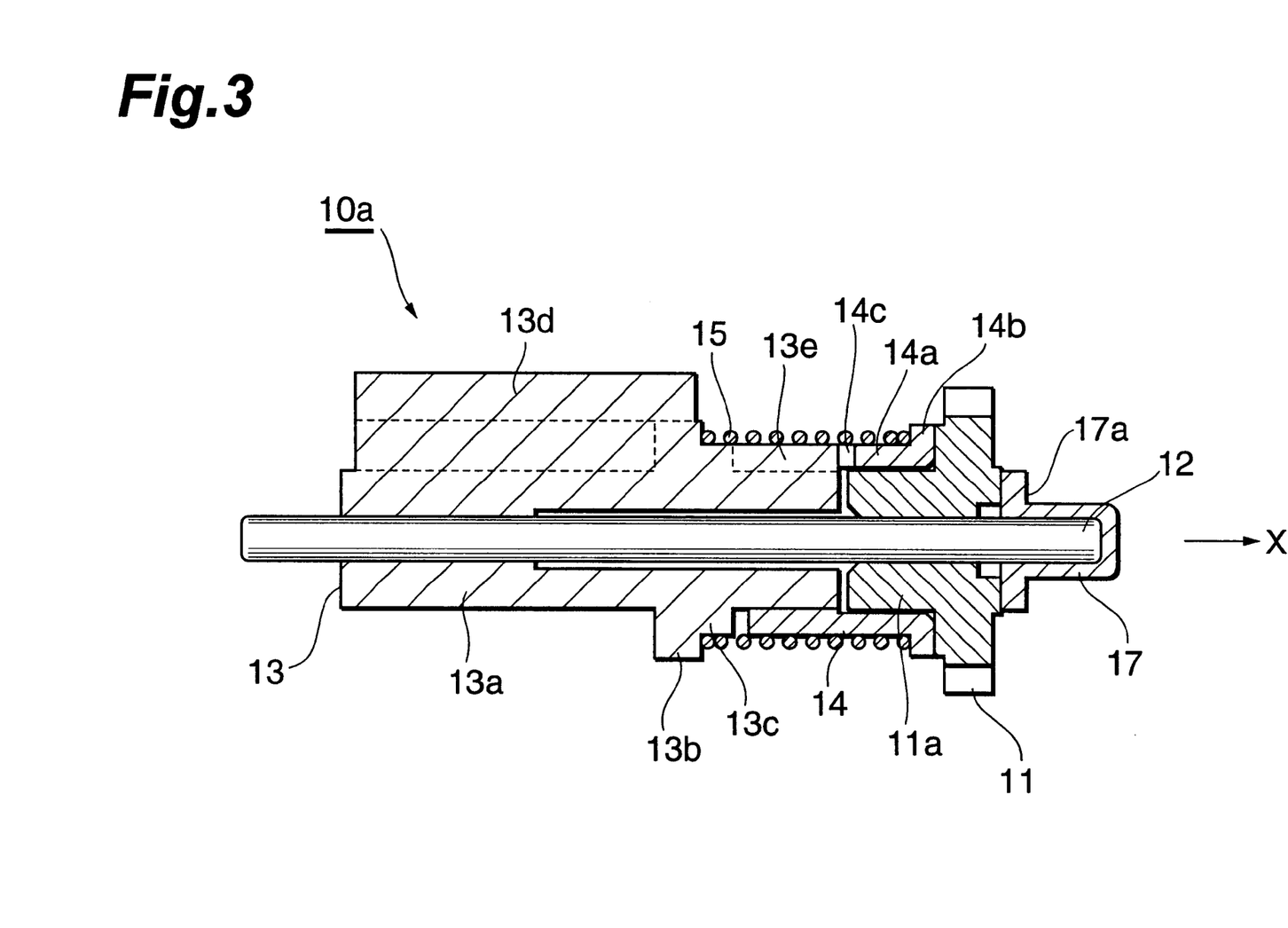
FIG. 3 is an explanatory view of a modified example of the diaphragm switching apparatus in accordance with the first embodiment.

Though the brim 12a projects from the shaft 12 in the diaphragm switching apparatus 10 as shown in FIG. 1, the brim 12a may be provided separately from the shaft 12. For example, as shown in FIG. 3, a cap 17 formed with a brim 17a may be attached to an end part of the shaft 12, such that the brim 17a is disposed at an outer peripheral position of the shaft 12. Thus configured brim 17a can receive the gear 11 urged by the compression spring 15, as with the above-mentioned brim 12a.

Second Embodiment

A diaphragm switching apparatus 20 in accordance with a second embodiment of the present invention will now be explained with reference to a drawing.

Figure 4:
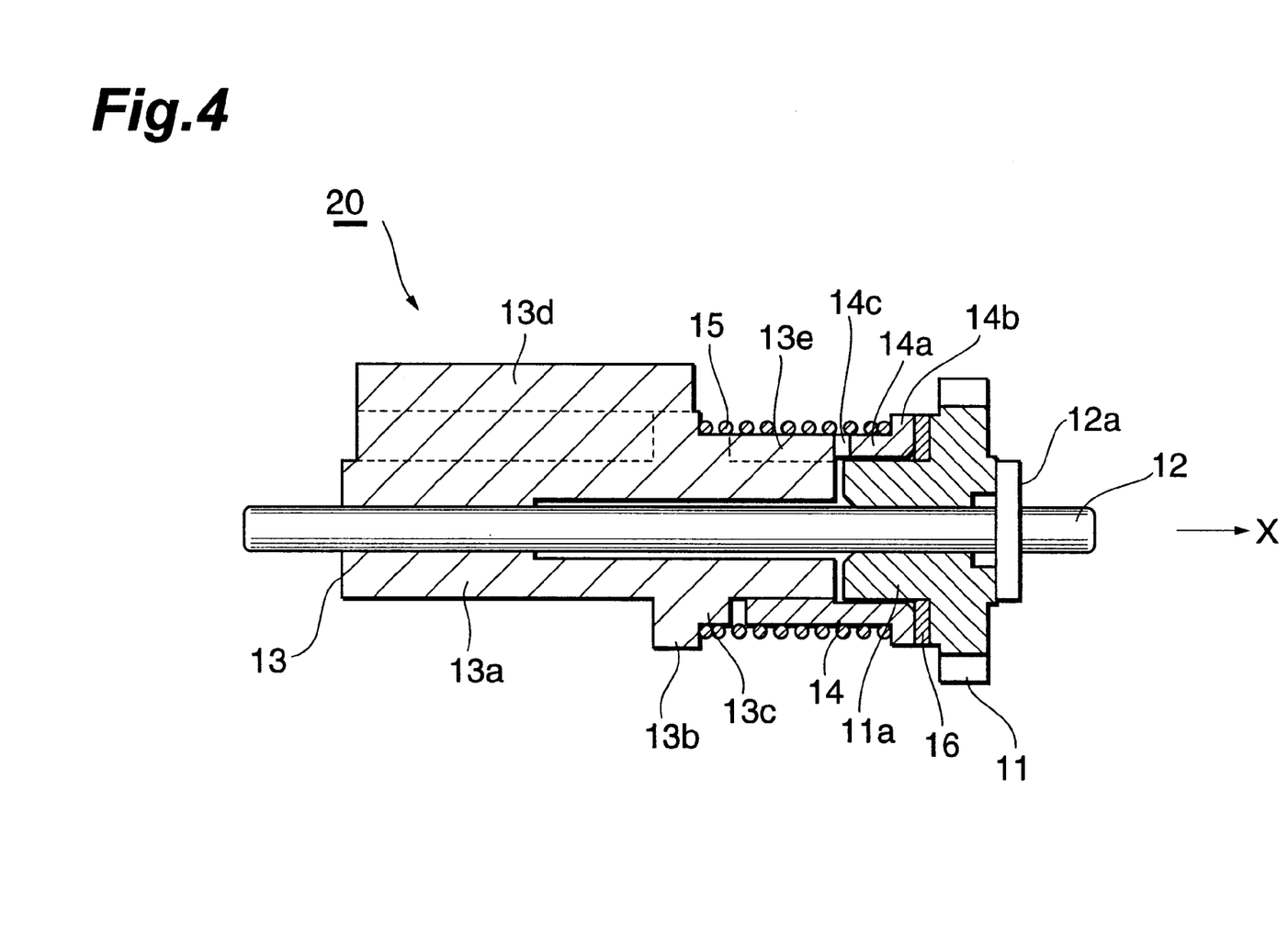
FIG. 4 is an explanatory view of the diaphragm switching apparatus in accordance with a second embodiment.

FIG. 4 is an explanatory view of the diaphragm switching apparatus 20 in accordance with this embodiment.

As depicted, the diaphragm switching apparatus 20 in accordance with this embodiment differs from the diaphragm switching apparatus 10 in accordance with the first embodiment in that it comprises a low-friction member 16 disposed at the outer periphery of the barrel 11a so as to abut against the left end face of the gear 11. Employed as the low-friction member 16 is one having a low coefficient of friction such as Teflon, for example. The intermediate member 14 is urged by the compression spring 15, so as to abut against the low-friction member 16 at the right end face of the flange 14b.

Therefore, when switching the diaphragm, the gear 11 rotates together with the low-friction member 16, thereby attaining a slipping rotation state with respect to the intermediate member 14 by way of the low-friction member 16.

According to the diaphragm switching apparatus 20, as explained in the foregoing, the low-friction member 16 is disposed between the intermediate member 14 and the gear 11, so that the frictional force between the gear 11 and the intermediate member 14 can be reduced when the gear 11 rotates in a slipping fashion, whereby the load applied to the focus motor can be lowered. Therefore, the torque of focus motor can be set lower, whereby the focus motor can further reduce its size, weight, and power consumption.

Figure 5:
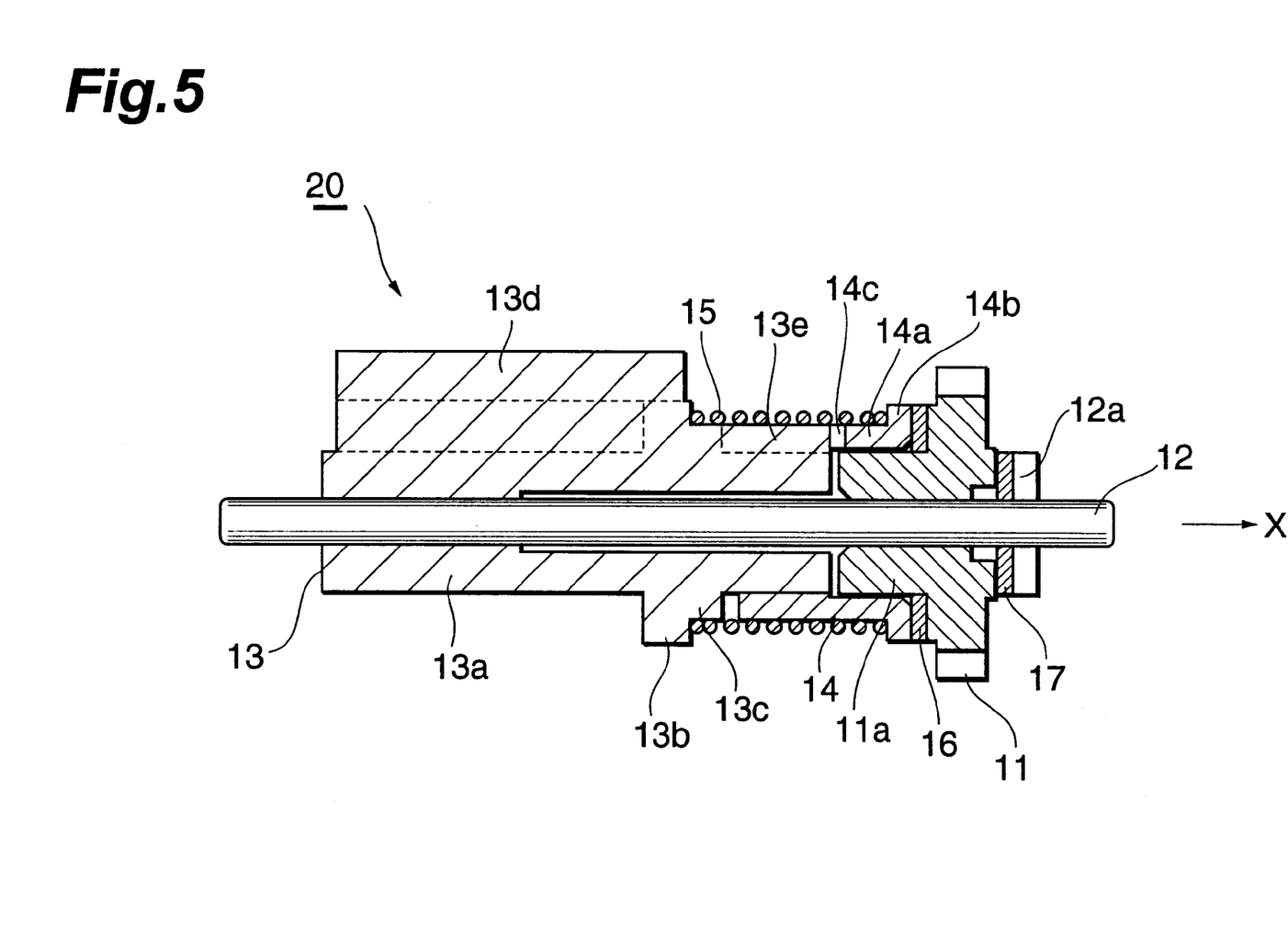
FIG. 5 is an explanatory view of a modified example of the diaphragm switching apparatus in according with the second embodiment.

FIG. 5 is an explanatory view of a modified example of the diaphragm switching apparatus in according with the second embodiment. As shown in FIG. 5, a low-friction member 17 maybe provided between the gear 11 and the brim 12a disposed on the shaft 12. The load applied to the focus motor can further be lowered in this case.

Third Embodiment

A diaphragm switching apparatus 30 in accordance with a third embodiment of the present invention will now be explained with reference to a drawing.

Figure 6:
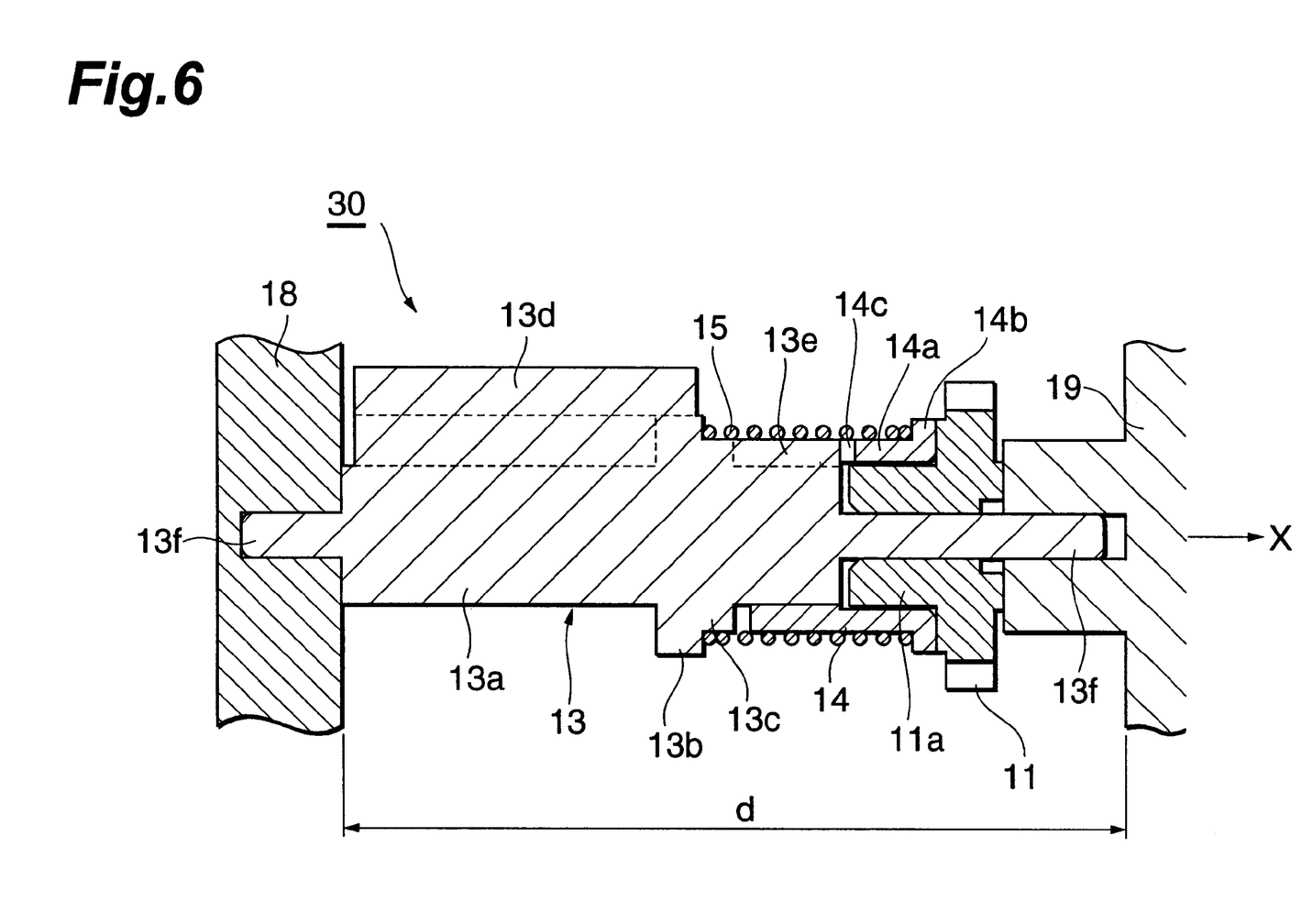
FIG. 6 is an explanatory view of the diaphragm switching apparatus in accordance with a third embodiment.

FIG. 6 is an explanatory view of the diaphragm switching apparatus 30 in accordance with this embodiment.

As depicted, the diaphragm switching apparatus 30 is supported by a left bearing part 18 and a right bearing part 19. The right bearing part 19 functions as a holding part, and stably receives the gear 11 urged by the compression spring 15 by way of the intermediate member 14.

Since this makes it unnecessary to provide a brim and the like as a holding part, the gear 11 can be arranged even when axial parts 13f, 13f are integrally formed with the diaphragm switching member 13 so as to project therefrom, whereby the diaphragm switching apparatus 30 can be assembled.

If the distance d between the left bearing part 18 and the right bearing part 19 is changed so as to alter the amount of compression of the compression spring 15, thereby regulating the force by which the compression spring urges the gear 11, the torque of the gear 11 in the slipping rotation state can be adjusted minutely. This can reduce fluctuations in operations among products.

For adjusting the distance d between the left bearing part 18 and the right bearing part 19, a mechanism for keeping one of them immobile while axially moving the other is used, for example.

The diaphragm switching apparatus 30 in accordance with this embodiment can also attain operations and effects similar to those in the diaphragm switching apparatus in accordance with the first embodiment mentioned above.

Fourth Embodiment

A diaphragm switching apparatus 40 in accordance with a fourth embodiment of the present invention will now be explained with reference to a drawing.

Figure 7:
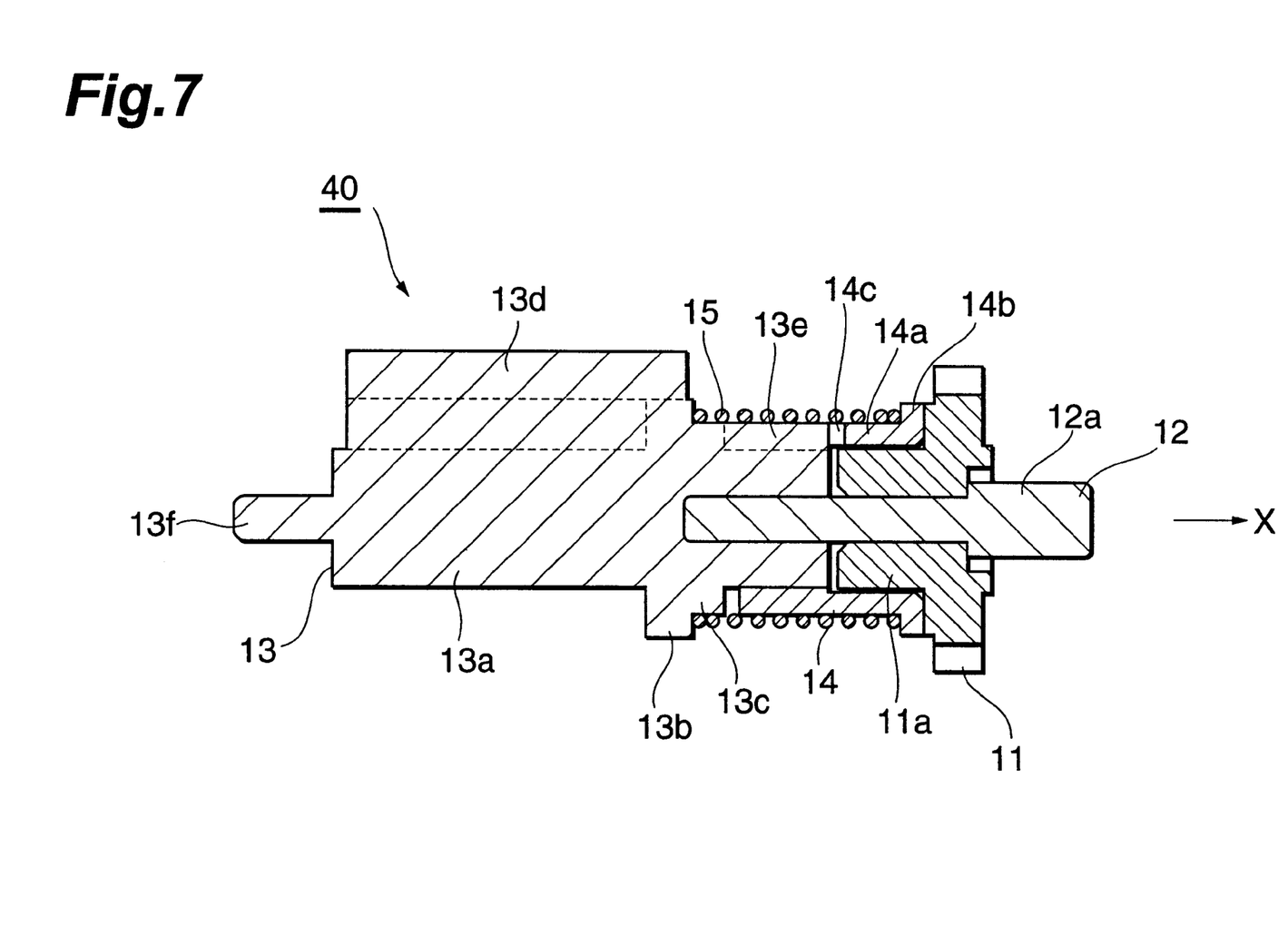
FIG. 7 is an explanatory view of the diaphragm switching apparatus in accordance with a fourth embodiment.

FIG. 7 is an explanatory view of the diaphragm switching apparatus 40 in accordance with this embodiment.

As depicted, the diaphragm switching apparatus 40 in accordance with this embodiment differs from the diaphragm switching apparatus 10 in accordance with the first embodiment in that an axial part 13f is integrally formed at the left end of the diaphragm switching member 13 and in that the shaft 12 is press-fitted into and secured to a press-fitting hole opening at the right end of the diaphragm switching member 13. The right end of the shaft 12 is formed with a larger diameter part 12a acting as a holding part. The larger diameter part 12a receives the gear 11 urged by the compression spring 15.

By way of the axial part 13f and the larger diameter part 12a, the diaphragm switching apparatus 40 in accordance with this embodiment is supported by the left bearing part 18 and right bearing part 19 as with the diaphragm switching apparatus 30 shown in FIG. 6.

The diaphragm switching apparatus 40 in accordance with this embodiment can attain operations and effects similar to those of the diaphragm switching apparatus in accordance with the embodiments mentioned above.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A diaphragm switching apparatus comprising:

a gear adapted to rotate in response to a driving force of a focus motor for driving a focus lens;

a shaft for rotatably supporting said gear;

diaphragm switching means, secured to said shaft and adapted to rotate together with said axis, for switching a diaphragm as said shaft rotates;

an intermediate member, attached to said shaft so as to be axially slidable, engaging said diaphragm switching means so as to rotate together with said shaft;

urging means for urging said gear away from said diaphragm switching means by way of said intermediate member by receiving a reaction force from said diaphragm switching means; and a holding part for receiving said gear urged by said urging means.

2. The diaphragm switching apparatus according to claim 1, wherein said holding part is a brim projecting from an outer periphery of said shaft.

3. The diaphragm switching apparatus according to claim 1, wherein a low-friction member is disposed between said intermediate member and said gear.

4. The diaphragm switching apparatus according to claim 1, wherein a low-friction member is disposed between said holding part and said gear.

5. The diaphragm switching apparatus according to claim 1, wherein said urging means is an elastic member; and wherein an urging force of said urging means is adjustable by changing a distance between said diaphragm switching means and said holding part.

* * * * *